No. 827,848. PATENTED AUG. 7, 1906.
C. DE CAZEN.
CIGARETTE MAKING MACHINE.
APPLICATION FILED JULY 19, 1905.

6 SHEETS—SHEET 1.

Witnesses.
Lloyd Blackmore
B. Herger

Inventor.
C. de Cazen

No. 827,848. PATENTED AUG. 7, 1906.
C. DE CAZEN.
CIGARETTE MAKING MACHINE.
APPLICATION FILED JULY 19, 1905.

6 SHEETS—SHEET 2.

Witnesses.
Lloyd Blackmore
B. Herger

Inventor.
C. de Cazen
by E. J. Fetherstonhaugh
Atty

UNITED STATES PATENT OFFICE.

CANAAN DE CAZEN, OF MONTREAL, CANADA.

CIGARETTE-MAKING MACHINE.

No. 827,848.  Specification of Letters Patent.  Patented Aug. 7, 1906.

Application filed July 19, 1905. Serial No. 270,418.

*To all whom it may concern:*

Be it known that I, CANAAN DE CAZEN, a subject of the King of Great Britain, residing at 95 Hotel de Ville avenue, in the city of Montreal, in the district of Montreal, in the Province of Quebec, in the Dominion of Canada, have invented certain new and useful Improvements in Cigarette-Making Machines, of which the following is a specification.

This invention relates to improvements in cigarette-making machines as described in the present specification and illustrated by the accompanying drawings, that form part of the same.

The invention consists, essentially, of a frame supporting a table and a casing supported above said table, a belt carrier extending around a pair of rollers journaled in the sides of said casing and having a plurality of picks projecting from the outer surface thereof, an enveloping tube supported above said table, a rotating wheel forming a guideway from said carrier to said enveloping tube, means for gathering the tobacco from said carrier and delivering to said tube, means for feeding the paper to said tube, and a main driving-shaft operatively connected to said carrier and said means.

The objects of the invention are to insure regularity in the feed of tobacco to the guideway and enveloping passage and to fasten, shear, and stamp the cigarette without interrupting the continuous output.

Figure 1:
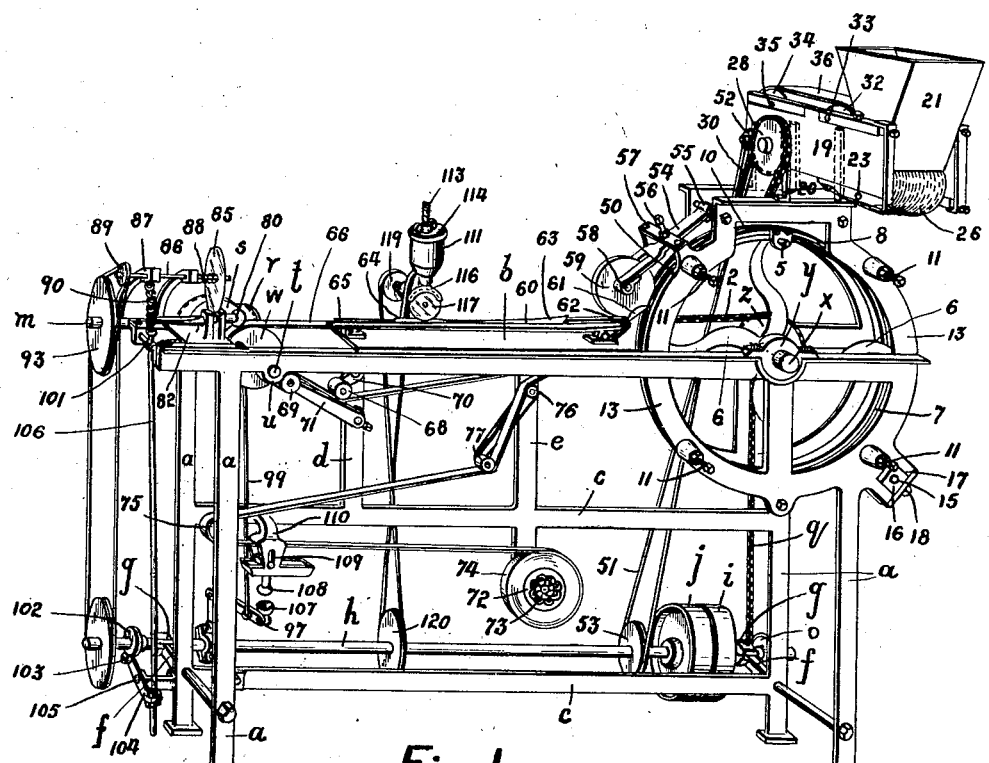
Figure 8:
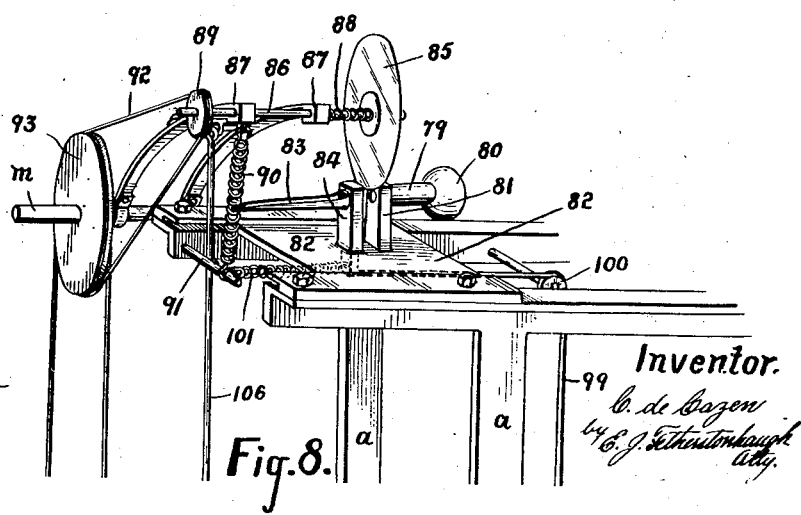
Figures 2, 4:
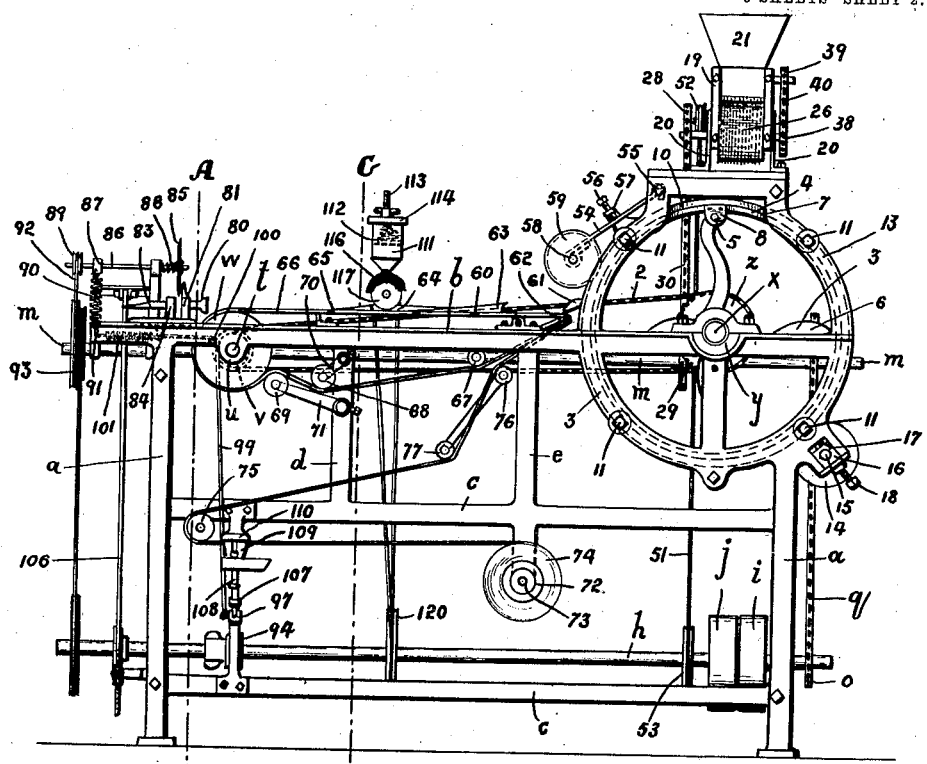
Figures 3, 9:
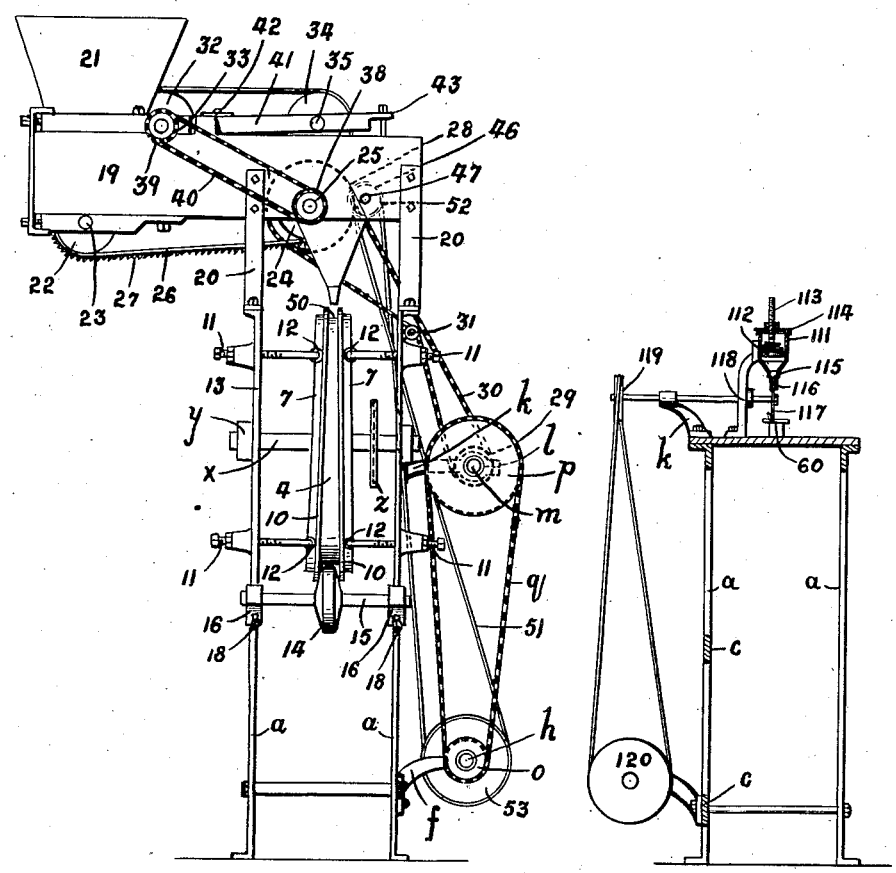
Figure 5:
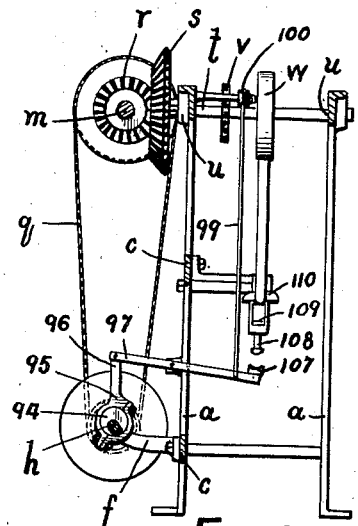
Figure 7:
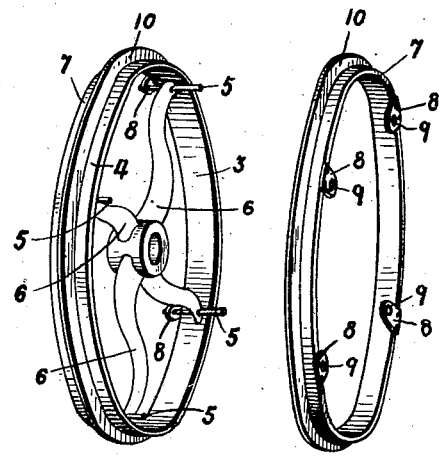
Figure 6:
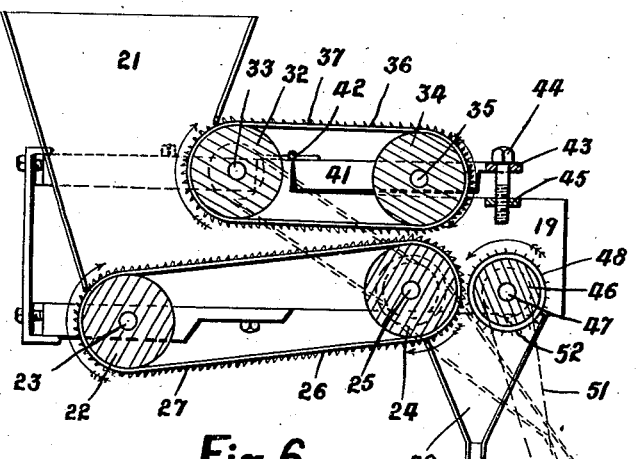
Figure 10:
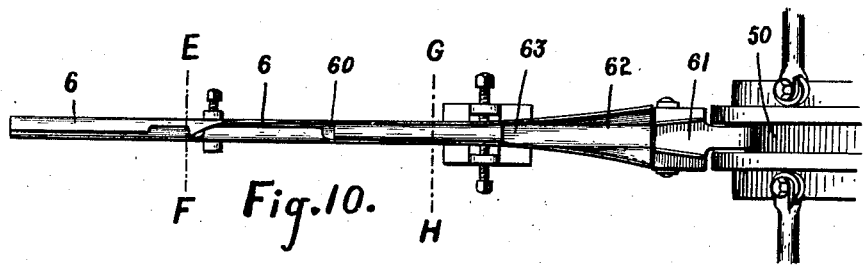
Figure 11:
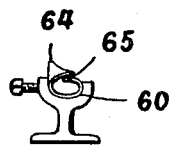
Figure 12:
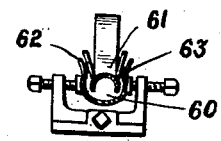
Figure 13:
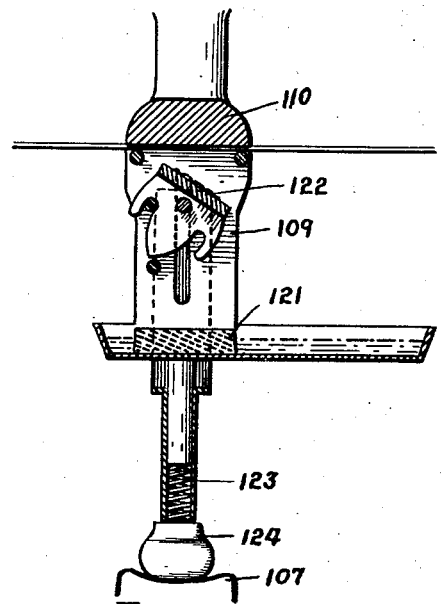
Figure 14:
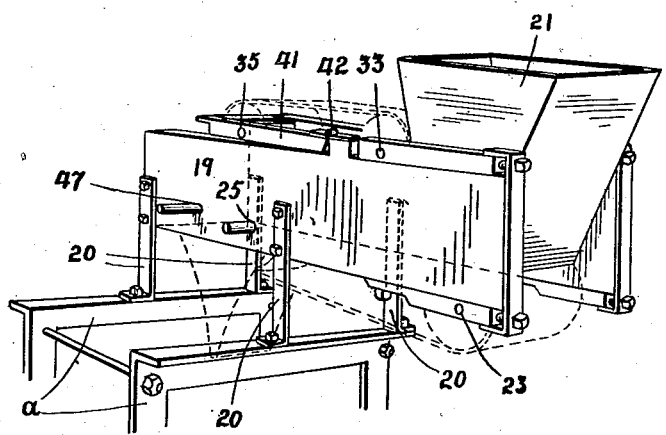
Figure 15:
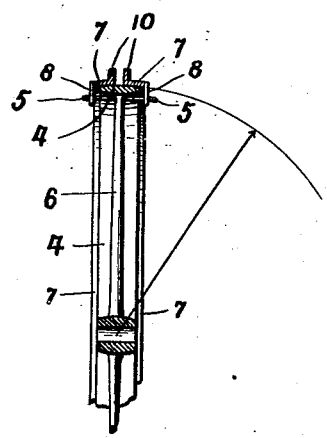

In the drawings, Figure 1 is a perspective view of the machine. Fig. 2 is a side elevation. Fig. 3 is an end elevation at the feed end. Fig. 4 is an end elevation at the shearing end. Fig. 5 is a sectional view through A B in Fig. 2, showing the stamping mechanism. Fig. 6 is a sectional view showing the rollers and carriers in the feed mechanism. Fig. 7 is a perspective detail of the rotating wheel forming the guideway. Fig. 8 is a perspective detail of the shearing mechanism. Fig. 9 is a sectional view through C D in Fig. 2. Fig. 10 is a plan view of the enveloping tube. Fig. 11 is a cross-sectional view through E F in Fig. 10. Fig. 12 is a cross-sectional view through G H in Fig. 10. Fig. 13 is a sectional detail of the self-inking stamp. Fig. 14 is an enlarged perspective view of the box in which the belt carriers operate, showing the manner in which the same is mounted on the frame. Fig. 15 is a detail showing the rim of the wheel illustrated in Fig. 7 and the rings in section fitting thereover.

Like characters of reference indicate corresponding parts in each figure.

$a$ represents the standards of the machine, supporting the table $b$, the cross-beams $c$, and the vertical beams $d$ and $e$.

$f$ represents brackets projecting outwardly toward the lower ends of the standards $a$ and supporting the bearings $g$.

$h$ is the main driving-shaft of the machine, journaled in the bearings $g$ and having the pulley $i$ connected by a suitable belt to the motive power.

$j$ is a loose pulley beside the driving-pulley, as usual.

$k$ represents brackets from the standards $a$ in proximity to the upper ends thereof, and $l$ represents bearings supported by said brackets.

$m$ is a shaft journaled in the bearings $l$.

$o$ is a sprocket-wheel secured on the shaft $h$, and $p$ is a sprocket-wheel secured on the shaft $m$ and connected to the sprocket-wheel $o$ by the chain belt $q$, forming the means for driving the shaft $m$.

$r$ is a bevel gear-wheel mounted on the shaft $m$ adjacent to the cutting end of the machine, and $s$ is a bevel gear-wheel mounted at the end of the shaft $t$, journaled in the bearings $u$ in the frame of the machine and meshing with the bevel gear-wheel $r$, by which it is driven and the shaft $t$ rotated.

$v$ is a sprocket-wheel mounted on the shaft $t$, and $w$ is a pulley mounted on the said shaft $t$.

$x$ is a shaft extending across the frame of the machine at the feeding end thereof and journaled in the bearings $y$, supported on the top beams.

$z$ is a sprocket-wheel mounted on the shaft $x$, and 2 is a chain belt connecting the sprocket-wheel $v$ and the said sprocket-wheel $z$ and completing the connection between the main driving-shaft $h$ and the shafts $x$ and $t$.

3 is a large wheel mounted on the shaft $x$ and keyed thereto and having a rim 4 with an arc-shaped periphery.

5 represents pins fixedly secured in the spokes 6 of said wheel and extending outwardly beyond the rim at each side thereof.

7 represents rings slightly larger in diameter than the wheel 3, so as to fit over the rim 4, and having their inner surface concave and corresponding in curve to the arc-shaped periphery of the rim and having the inwardly-extending lugs 8, in which are the holes 9. The rings 7 are mounted on the rim of the wheel 3, the pins 5 extending at each side through the lugs 8. The rings 7 have the annular flanges 10, and in fitting the said rings onto the wheel these flanges do not meet, but leave a clear space therebetween completely around the wheel, the rim 4 forming the bed of the passage between the said flanges.

11 represents threaded pins having rollers 12 journaled in suitable bearings at one end thereof and threaded at the other end. The pins 11 are inserted in threaded orifices in the frame 13 and extend inwardly from opposite sides of the frame in pairs, respectively, until the rollers abut the annular flanges 10, thus providing the means for retaining the rings 7 on the rim 4. The pins 11 are eight in number—namely, four pairs diametrically arranged in pairs and adjusted to leave a wider space in the passage between the flanges 10 on one side of the wheel than on the other—and at the widest point between the flanges a rotating wedge 14 is provided to keep the said flanges apart at that point, no matter what the position of said wheel, the rotating wedge 14 being mounted on a shaft 15 and turning freely thereon. The shaft 15 extends across the frame of the machine and is supported between the adjustable blocks 16, introduced in the slots 17 in the frame of the machine. The position of the blocks 16 is controlled by the threaded pins 18, turning in threaded orifices in the plates covering the slots. It will be thus seen that the wheel 3 is rotated by the chain-belt connection with the shaft $t$ and in turning the said wheel 3 carries the rings 7. The said rings are always kept the same distance apart where the wedge 14 rotates between them, and diametrically opposite thereto will be the narrowest point in the passage between the flanges 10. The wedge 14 is rotated between said flanges by contact with the wheel 3.

19 is a casing supported by the standards 20 from the frame $a$ above the table $b$ and above the wheel 3.

21 is a hopper extending out from within the casing at one end of the same.

22 is a roller journaled in the bearings 23 in the side of the casing toward the lower edge thereof. 24 is a roller journaled in bearings 25 toward the other end of the casing and slightly higher up in the sides.

26 is a belt the full width of the rollers and extending therearound and having a multiplicity of small picks 27 projecting from the outer surface thereof, arranged in rows longitudinally with the belt and having a slight inclination forward in the direction of travel.

28 is a sprocket-wheel mounted on the end of the shaft of the roller 24 where it projects beyond the casing 19.

29 is a sprocket-wheel on the shaft $m$, and 30 is a chain belt, connecting the sprocket-wheels 28 and 29, the said belt on one side passing over the pulley 31 to escape interference with the wheel 3. The rollers 22 and 24 are thus operated by the chain-belt connection with the shaft $m$.

32 is a roller journaled in the bearings 33 in proximity to the top of the sides of the casing 19.

34 is a roller journaled above the roller 24 in the bearings 35 in the sides of the casing. The bearings 35 are slightly lower down in the sides than the bearings 33.

36 is a belt extending around the rollers 32 and 34 and having a multiplicity of small picks 37 projecting from the outer surface thereof and inclined slightly backward from the direction of travel.

38 is a sprocket-wheel on the shaft of the pulley 24 where it extends beyond the casing 19.

39 is a sprocket-wheel on the shaft of the roller 32 where it extends beyond the casing 19, and 40 is a chain belt connecting the sprockets 38 and 39 and insuring the rotation of the rollers 24 and 32 in the same direction, and thus causing the belts facing one another to travel in opposite directions. It may be here explained that the sides of the casing have the separable pieces 41 hinged at 42 to the permanent portions of the sides, and in these separable pieces the bearings 35 are located. The pieces 41 have extending lugs 43, through which extend the threaded bolts 44, reaching into the threaded orifices 45 in the permanent portion of the casing. It is thus possible to raise the bearings 35 and increase the distance between the belts 26 and 36 where the said belts surround the rollers 24 and 34.

46 is a roller journaled in the bearings 47 in the sides of the casing and having a multiplicity of picks 48 intermeshing with the picks 27 as they pass over the roller 24.

49 is a hopper immediately under the rollers 24 and 46 and emptying into the passage between the flanges 10 where the said passage forms the guideway 50 for the tobacco carried over the belt 26 and gathered by the roller 46 and delivered through the hopper 49. The roller 46 is rotated by the belt connection 51, extending around the pulleys 52 and 53, mounted on the roller and main shafts, respectively.

54 is an arm pivoted at 55 in the frame and supported by the adjusting-screw 56, inserted through the bracket 57 and said arm. The arm 54 has at the end thereof the bearing 58, on which the wheel 59 freely turns. The rim of the wheel 59 extends into the guideway 50 in proximity to the periphery of the rim 4.

60 is the enveloping tube, and 61 is the bridge from the guideway 50 to the enveloping tube. The said enveloping tube is opened out at 62, at 63 is partially closed in, at 64 one edge thereof projects upwardly, and at 65 the passage is completely closed in regular tube form.

66 is a ribbon belt, preferably of textile material, extending around the pulley w on the shaft t along the enveloping tube 60 and over and against the rollers 67, 68, and 69. The rollers 68 and 69 are journaled at the extremity of the arms 70 and 71, respectively, which are adjustably secured to the vertical beam d and extend therefrom to engage the ribbon belt 66 with their rollers 68 and 69 on different sides and have the effect of taking up the slack of said belt.

72 is a roller journaled in the bearing 73 in a lower extension of the vertical beam e and carrying a roll of cigarette-paper 74 in ribbon form. During the operation of the machine this ribbon of paper extends from the roller around the pulley 75, journaled in suitable brackets from the frame of the machine, and over the roller 76. The roller 77 on the pivoted arm 78 engages said ribbon of paper intermediately between the roller 76 and the roller 75. This pivoted arm on the momentary stoppage of the feed of paper will give slightly, and thus prevent any breakage of the paper. The ribbon of paper continues on and enters the enveloping tube 60 between the bridge 61 and the end edge of said tube over the ribbon belt 66. The friction of the paper on the ribbon belt carries the former forward and it passes along the enveloping tube 60 and is folded as it continues therealong to the partially-closed portion and in passing leaves one edge protruding upwardly at 64 in said passage, and at 65 the paper is completely closed in on the tobacco, which it must contain on passing through.

79 is a tube having the bell-mouth 80 in direct line with the discharge end of the enveloping passage 60. The tube 79 extends from and through a bracket 81, projecting upwardly from a sliding portion 82 of the table.

83 is a tube extending from and through the bracket 84 in said portion of the table in direct alinement with the tube 79.

85 is a circular knife mounted at the end of the spindle 86, journaled in swinging bracket-arms 87.

88 is a spiral spring encircling the spindle between the knife and the bracket for the purpose of allowing the spindle a limited lateral movement in its bearings.

89 is a pulley mounted on the spindle 86 at the other end. The brackets 87 extend from the shaft m and hold the knife in position directly over the space between the brackets 81 and 84.

90 is a spring caught at one end to a pin 91, projecting from the frame, and at the other end to the brackets 87 and is for the purpose of preventing the knife from being lifted too high.

92 is a belt connecting the pulley 93 on the shaft m to the pulley 89 on the spindle 86.

94 is an eccentric mounted on the shaft h. 95 is the strap encircling said eccentric.

96 is a connecting-rod from the lever 97 to the cord 99, which passes over the pulley 100 and is caught at the other end to the spring 101, this spring being attached to the sliding portion 82 of the table to return the said portion of the table to the first position for the shearing.

102 is a cam on the main shaft, which engages the roller 103, journaled at the end of the arm 104, which arm is pivoted intermediately of its length at 105 on the frame of the machine and at its other end pivotally and adjustably secured to a rod 106. The said rod 106 is secured at its upper end to the brackets 87, which bracket-arms will both move on any movement of the rod 106 and lift the knife in readiness for its descent on the length of roll passing through the tubes. The lever 97 extends beyond the point where the cord 99 is attached thereto and preferably has a projection 107 on its upper side at the extremity.

109 is a self-inking stamp of an ordinary pattern, having the pad 121 and the reversing type-plate 122. The reversing type-plate 122 is normally held to the pad by the spring 123 pressing downwardly against the handle 124, and the said handle is connected to said type-plate. The handle 124 is engaged at intervals by the projection 107 and forced upwardly and, as through the frame of the stamp, the said handle is connected to the type-plate, said type-plate is pushed from the pad upwardly, and is inverted in its passage upwardly by the cam movement usual in this class of stamp. The type thus stamps the paper in passage against the plane surface on a projecting bracket 110, and on release of the engagement of the projection 107 with the handle 124 of the stamp the spring in the said handle returns the type-plate to the pad, as customary.

111 is a paste-pot of any suitable design, herein shown as having an adjustable inner cover 112, spring-held against the paste and moved up or down by the threaded spindle 113, projecting upwardly from said inner cover to the outer cover 114. The said paste-pot 111 has an outlet at 115, which leads through the shield 116, in which the outer portion of the disk 117 turns. The disk 117 turns with the spindle, journaled in the bracket 118 on the table b above the enveloping tube 60.

119 is a pulley mounted on said spindle and having belt connection with the pulley 120 on the main shaft h.

In rotation the disk 117 brushes the outlet 115 and insures the inner edge of said disk being continually covered with paste. The disk revolves very rapidly and the inner edge abuts the ribbon of paper where it projects upwardly in the enveloping tube at 64, and thus applies paste constantly to the said ribbon of paper as it passes through, and as the said ribbon of paper passes on the paper, as before explained, closes in and is made to closely adhere to the other side of the paper, where the enveloping tube closes in at 65.

Having described the various parts in detail, I shall now more particularly explain the operation thereof. The tobacco is fed in quantities to the hopper 21, and drops onto the belt 26. On setting the machine in motion the picks 27 carry the tobacco from the hopper forward, and on the said tobacco reaching the space between the rollers 24 and 34 the picks 37 on the belt 36, which are pointing in the reverse direction from the travel of the belt 36, have the effect of dragging on the tobacco carried by the belt 26 and evening the surface down, and thus regulating the quantity. The feed thus regulated, the tobacco begins to pass around the roller 24, but is gathered therefrom by the roller 46, which is rotating in the opposite direction. The tobacco is thus emptied into the hopper 49 and from the said hopper passes out to the guideway 50. The wheel 3, as before explained, is constantly rotating, and the guideway at this point at all times is exactly the same width. Therefore the tobacco is pressed into cigarette form by passing under the wheel 59 in the said guideway for its passage along the enveloping tube. The tobacco in its pressed state is guided by the bridge 61 on and into the enveloping tube 60. The paper being fed from the roll is also on its way to the enveloping tube and from friction with the textile ribbon belt is carried along. It will be thus seen that the ribbon belt carries the paper along with it, and the string of tobacco is carried therealong with said paper into the closed portion of the enveloping tube. The tobacco in the paper now has reached the portion 64 of the tube 60 and is quite enveloped on one side by the paper, while the other side of the paper projects upwardly and receives its quantum of paste. As soon as the paper receives its paste it passes into the closed portion 65, where it must fold over the side of the cigarette which has already been enveloped and made to adhere to the other side, and thus form the perfect cigarette. The cigarette now is in a long string, and as it reaches the pulley $w$ it continues in a straight line over the edge thereof into the tube 79 and on through the tube 83; but in the meantime the other parts of the machine are operating, and the shearing mechanism acts as the cigarette crosses between the brackets 81 and 84. The cam 102 is formed to operate the knife twice for every complete revolution of the said cam with its shaft, and as the knife is revolving very rapidly the string of cigarette is cut, and in cutting, in order that the action of cutting will not affect the continuous feed of the machine, the knife moves slightly with the travel until released and in its upper position.

The stamping or printing of the paper will be readily understood from the description in detail, as the paper merely passes over a small table formed from a bracket from the cross-beam, and the plunger of the stamp is forced upwardly and prints across the paper whatever may be desired, and the spring will return the said plunger ready for the next operation. In the stamping or printing of the paper the parts operating the stamp are designed with a view of causing the plunger of said stamp to be engaged once for every two operations of the knife shearing the length of cigarette passing through. The reason for this may be explained that the stamp makes an impression on the paper which will answer for two cigarettes, as the shearing takes place in the middle of the said impression, or substantially so.

What I claim as my invention is—

1. In a cigarette-making machine, the combination with a frame, an enveloping tube supported thereby, and means for guiding the length of paper into said enveloping tube, of a box supported above said frame and having bearings in the upper and lower portions of the sides thereof, a pair of rollers journaled in the upper bearings in said box, a belt-carrier extending around said rollers and having a downward inclination in the direction of travel, a pair of rollers journaled in bearings in the lower portion of said box, a belt-carrier extending therearound and having an upward inclination in its direction of travel, a hopper extending into said box and having its discharge-opening immediately over the lowermost carrier, a roller journaled in bearings in the lower portion of said box in proximity to the said lowermost belt-carrier and gathering the tobacco therefrom, and a hopper below said roller having a discharge-opening leading toward said enveloping tube, as and for the purpose specified.

2. In a cigarette-making machine, the combination with a frame, an enveloping tube supported thereby, and means for guiding the paper into said enveloping-tube, of a box supported above said frame having bearings in the upper and lower portions of the sides, a pair of rollers journaled in bearings in the lower portion of said side, a belt-carrier extending around said rollers and having a plurality of picks projecting from the surface thereof inclined forwardly in the direction of travel of said carrier, a hopper extending into said box and having its discharge-opening directly over said carrier, a roller journaled in bearings in the lower portion of said box to one end of said carrier and having picks meshing with the aforesaid picks and gathering the tobacco from said carrier, a pair of rollers journaled in bearings in the upper portion of said box, a belt-carrier extending around said rollers and loc ted over the forward part of the aforesaid belt-carrier and angularly inclined thereto, and having a plurality of picks projecting from the surface thereof inclined backwardly from the direction of travel of said carrier and means for guiding the tobacco from the first-named carrier into the machine, as and for the purpose specified.

3. In a cigarette-making machine, the combination with the frame, an enveloping tube supported thereby and means for guiding the paper into said enveloping tube, of a box supported above said frame and having bearings in the upper and lower portions of its sides and adjustable parts hinged to the top of said sides and bearings in said parts, a pair of rollers journaled in the bearings in the lower portion of said sides, a belt-carrier extending around said rollers and having picks projecting from the surface thereof inclined in the direction of travel of said carrier, a roller rotating in the opposite direction to the aforesaid rollers and having picks meshing with the aforesaid picks and journaled in bearings in the lower portion of said sides, a pair of rollers rotating in the same direction as the rollers of the aforesaid carrier, one of which is journaled in bearings in the upper portion of the sides and the other journaled in the bearings in the said adjustable parts, a belt-carrier extending around said rollers and having picks projecting from its surface inclined rearwardly from the direction of travel of the said carrier, a hopper extending into the box and having the discharge-opening immediately over the lowermost carrier, and a hopper receiving the tobacco from said lowermost carrier and the gathering-roller and dropping the same into the machine, as and for the purpose specified.

4. In a cigarette-making machine, in combination, a frame, forming mechanism, a box supported by said frame above said wheel having bearings in the upper and lower portions of the sides, a belt-carrier extending around suitable rollers journaled in said lower bearings and having picks from the surface thereof inclined forwardly in the direction of travel of said carrier, a hopper extending into said box and emptying onto said carrier, a roller journaled in the sides of said box having picks meshing with the aforesaid picks at one end of said carrier and gathering the tobacco therefrom, a belt-carrier extending around rollers journaled in the upper bearings in said box and having picks inclined backwardly from the direction of travel and extending into proximity with the aforesaid belt-carrier at the delivery end of the latter, and a rotating wheel having a guideway formed on the rim thereof and receiving tobacco from said feed mechanism and delivering the same to said forming mechanism, as and for the purpose specified.

5. A cigarette-making machine, comprising a feed mechanism, an enveloping tube, a guideway from said feed to said enveloping tube, means for carrying a ribbon of paper through said tube, a stamping-table over which said paper passes, a stamp secured to said table, means for shearing, means for engaging and operating said stamp one time to every two operations of said shearing mechanism, a frame supporting said parts, and a main driving-shaft journaled from said frame, as and for the purpose specified.

6. A cigarette-making machine, comprising a feed mechanism, an enveloping tube, a rotating wheel forming a guideway from said feed to said enveloping-tube, a shaft suitably journaled and operatively connected to the shaft of said rotating wheel, a pulley on the aforesaid shaft, a ribbon belt extending around said pulley and through said enveloping tube, a roller suitably journaled having a roll of paper in ribbon form mounted thereon, a plurality of rollers over which said paper passes to said enveloping tube, a pivoted arm having a roller at the end thereof resting against the paper between the stamping-table and the enveloping tube for obtaining the necessary stamping pause, a shearing mechanism, a stamping mechanism, means for operating said stamping mechanism one time to every two operations of the shearing mechanism, a frame having a plurality of bearings and supporting the various parts, and a main shaft journaled in bearings from the frame, as and for the purpose specified.

7. In a cigarette-making machine, the combination with the frame supporting a table, a casing containing a feed mechanism supported above said table, and an enveloping tube, of a rotating wheel journaled in the frame of the machine beneath said feed mechanism and having a plain arc-shaped surface to its rim, extending without interruption from side to side, a ring having its inner surface concave and mounted on the arc-shaped rim of the wheel, and adjustably arranged in relation to the opposing ring on said wheel at each side of said rim, and forming a passage from said feed to said enveloping tube, and a main driving-shaft, as and for the purpose specified.

8. In a cigarette-making machine, the combination with the frame supporting a table, a casing containing a feed mechanism supported above said table and an enveloping tube, of a rotating wheel journaled in the frame of the machine beneath said feed mechanism, a plurality of pins projecting laterally from the spokes at each side thereof, a pair of rings having their inner surfaces concave and mounted on the arc-shaped rim of said wheel, and having inwardly-extending lugs through which said pins extend, said rings forming a guideway from said feed to said enveloping tube, and a main driving-shaft, as and for the purpose specified.

9. In a cigarette - making machine, the combination with the frame supporting a table, a casing containing a feed mechanism supported above said table, and an enveloping tube, of a rotating wheel, and pins extending through its spokes beyond the rim at each side thereof, and a pair of rings having their inner surfaces concave and mounted on the arc-shaped rim of the wheel, annular flanges and inwardly-extending lugs, said pins extending through the lugs, and a main driving-shaft, as and for the purpose specified.

10. In a cigarette - making machine, the combination with the frame supporting a table, and a casing containing a feed mechanism supported above said table and an enveloping tube, of a rotating wheel having an arc-shaped periphery to its rim, a pair of rings having their inner surfaces concave and mounted on the arc-shaped rim of the wheel and having annular flanges forming a guideway from said feed to said enveloping tube, a plurality of pins extending through the frame of the machine and adjustably secured therein, and having rollers journaled at the ends thereof engaging the said rings at diametrically opposite points, a rotating wedge turning on a shaft adjustably held in the frame diametrically opposite said guideway and extending between said flanges, and a main driving-shaft, as and for the purpose specified.

11. In a cigarette-making machine, in combination, a frame supporting a table, a feed mechanism supported thereabove, an enveloping tube, a shaft extending across said frame, a pulley mounted on said shaft, a ribbon belt extending around said pulley and through said enveloping tube, a roll of paper in ribbon form mounted on a roller journaled in the frame of said machine and extending to said ribbon belt, a plurality of rollers guiding said paper, a pivoted arm having a roller journaled at the end thereof engaging said paper intermediate of the distance between two of said rollers, a self-inking stamp through which said ribbon of paper extends, means for operating the plunger of said stamp concurrently with the operation of the other parts of the machine, and a main driving-shaft, as and for the purpose specified.

12. In a cigarette-making machine, in combination, a frame supporting a table, a feed mechanism supported thereabove, an enveloping tube, a shaft extending across said frame, a pulley mounted on said shaft, a ribbon belt extending around said pulley and through said enveloping tube, a roll of paper in ribbon form mounted on a roller journaled in the frame and extending to said ribbon belt, a plurality of rollers guiding said paper, a pivoted arm having a roller journaled at the end thereof engaging said paper intermediate of the distance between two of said rollers, a self-inking stamp through which said ribbon of paper extends, a lever pivoted in the frame and engaging the plunger of said stamp, an eccentric mounted on the driving-shaft, and a strap encircling said eccentric and having an arm therefrom pivotally connected with said lever, and a main driving-shaft, as and for the purpose specified.

13. In a cigarette-making machine, in combination, a frame supporting a table, a feed mechanism supported thereabove, an enveloping tube, and a shaft extending across said frame, a pulley mounted on said shaft and turned thereby, a ribbon extending around said pulley and through said enveloping tube, a roll of paper in ribbon form mounted on a roller journaled in the frame of said machine and extending to said ribbon belt, a plurality of rollers guiding said paper, a pivoted arm having a roller journaled at the end thereof engaging said paper intermediate of the distance between two of said rollers, a self-inking stamp secured to a bracket from the machine, the latter forming a table over which said ribbon of paper passes to be stamped, a lever pivoted in the frame of the machine having a projection from the end thereof engaging the plunger of said stamp, an eccentric mounted on the main driving-shaft, a strap encircling said eccentric, having an arm therefrom pivotally connected to said lever, and a main driving-shaft, as and for the purpose specified.

14. In a device of the class described, in combination, a frame having a plurality of bearings arranged therein, a feed mechanism supported above said frame, an enveloping tube supported by said frame, a plurality of pulleys mounted on shafts journaled in said bearings, a belt extending around said pulleys and through said enveloping tube, a roller journaled in said bearings, a roll of paper in ribbon form mounted on said roller, a plurality of rollers journaled in said bearings over which the said ribbon of paper extends to the enveloping tube, an arm pivoted from the frame and having a roller journaled from the end thereof loosely engaging said ribbon of paper intermediately between the last-named rollers, a self-inking stamp secured over a bracket forming a table and having a spring-held plunger, means engaging said spring-held plunger at regular intervals as the said ribbon of paper passes over said bracket-table, and a main driving-shaft having operating connection with the various parts, as and for the purpose specified.

15. In a device of the class described, in combination, a frame having a plurality of bearings, a casing supported above said frame, a plurality of belt-carriers, turning on rollers journaled in the sides of said casing, a sprocket-and-chain mechanism connecting the shafts of said rollers, a main driving-shaft journaled in bearings in brackets from the side of the frame, a shaft parallel with said main driving-shaft journaled in brackets in the side of the frame thereabove, a sprocket-and-chain mechanism connecting said shafts, a sprocket-and-chain mechanism connecting the upper shaft and the aforesaid rollers, a rotating wheel journaled in suitable bearings beneath said feed mechanism forming a guideway from said feed, an enveloping tube leading from said guideway, a shaft journaled in bearings in said frame at right angles to the aforesaid shaft, having a pulley secured thereon, a sprocket-and-chain mechanism forming the operating connection between said shaft and the shaft of said rotating wheel beneath said feed mechanism, a gear mechanism forming the operating connection between the shaft above the main driving-shaft and the shaft journaled at right angles thereto in the frame, a shearing mechanism, a cam on said main driving-shaft operating said shearing mechanism a plurality of times for every once of the stamping mechanism, a slidable table carrying said shearing mechanism, a stamping mechanism, an eccentric on said main driving-shaft having an operating connection with said slidable table and said stamping mechanism, a pasting mechanism, a belt-and-pulley connection thereto from the main shaft, and a belt-and-pulley connection from the shaft above the main shaft of said shearing mechanism, as and for the purpose specified.

Signed at Montreal, in the district of Montreal, in the Province of Quebec, in the Dominion of Canada, this 17th day of July, 1905.

C. DE CAZEN.

Witnesses:
LLOYD BLACKMORE,
B. HERGER.